(12) United States Patent
Chung

(10) Patent No.: US 9,744,585 B1
(45) Date of Patent: Aug. 29, 2017

(54) CONTINUOUS HEATING DEVICE FOR COIL SPRINGS AND HEATING METHOD FOR COIL SPRINGS USING THE SAME DEVICE

(71) Applicant: DAEWON APPLIED ENG. CO., Siheung-si, Gyeonggi-do (KR)

(72) Inventor: Chan-Ki Chung, Incheon (KR)

(73) Assignee: DAEWON APPLIED ENG. CO., Siheung-si (KR)

( * ) Notice: Subject to any disclaimer, the term of this patent is extended or adjusted under 35 U.S.C. 154(b) by 0 days.

(21) Appl. No.: 15/349,653

(22) Filed: Nov. 11, 2016

(30) Foreign Application Priority Data

May 17, 2016 (KR) ................... 10-2016-0060260

(51) Int. Cl.
| | |
|---|---|
| H05B 6/10 | (2006.01) |
| H05B 6/22 | (2006.01) |
| H05B 6/16 | (2006.01) |
| B21F 35/00 | (2006.01) |
| B21F 3/02 | (2006.01) |
| F16F 1/04 | (2006.01) |

(52) U.S. Cl.
CPC ............. B21F 35/00 (2013.01); B21F 3/02 (2013.01); *F16F 1/04* (2013.01); *F16F 2226/04* (2013.01)

(58) Field of Classification Search
CPC .. B21F 35/00; B21F 3/02; B21F 99/00; F16F 1/04; F16F 2226/04; H05B 6/10; H05B 6/36; H05B 6/40; C21D 1/10; C21D 9/02

USPC ....... 219/635, 636, 637, 643, 646, 652, 653, 219/654
See application file for complete search history.

(56) References Cited

U.S. PATENT DOCUMENTS

| | | | | |
|---|---|---|---|---|
| 2,490,206 | A | * 12/1949 | Calley .................... | C21D 9/02 219/635 |
| 2,495,193 | A | * 1/1950 | Wells ..................... | H05B 6/40 219/635 |
| 8,912,472 | B1 | 12/2014 | Kurylo et al. | |
| 2008/0128057 | A1 | 6/2008 | Hufnagel et al. | |

FOREIGN PATENT DOCUMENTS

| | | |
|---|---|---|
| JP | 5707126 B2 | 4/2015 |
| KR | 10-0752224 B1 | 8/2007 |
| KR | 10-2016-0036885 A | 4/2016 |
| KR | 101611786 B1 | 4/2016 |

* cited by examiner

*Primary Examiner* — Hung D Nguyen
(74) *Attorney, Agent, or Firm* — Novick, Kim & Lee, PLLC; Jae Youn Kim

(57) ABSTRACT

Provided is a continuous heating device for coil springs and a continuous heating method for coil springs using the same. The device may include: a pair of tapered rollers configured to support and rotate the coil spring, configured to have a cross-sectional diameter that increases as it goes from the front end portion to the rear end portion, and configured to have rotational inner surfaces that are arranged to be parallel with each other while the central rotation axes thereof are not parallel with each other; a conveyor chain configured to have a push rod that is installed therein to move the coil spring; and a driving unit configured to provide a rotational driving force to the pair of tapered rollers.

11 Claims, 4 Drawing Sheets

CONTINUOUS HEATING DEVICE FOR COIL SPRINGS AND HEATING METHOD FOR COIL SPRINGS USING THE SAME DEVICE

CROSS-REFERENCE TO RELATED APPLICATIONS

The instant application claims priority to Korean patent application No. 10-2016-0060260 filed on May 17, 2016, the entire content of which is hereby incorporated by reference.

BACKGROUND OF THE INVENTION

1. Field of the Invention

The present invention relates to a continuous heating device for coil springs that are formed in the shape of a coil by using a steel wire for a spring. More specifically, the present invention relates to a continuous heating device for coil springs, which provides an automated process for continuously heating coil springs through an electrical induction heating process in which the coil springs do not come in direct contact with a heat source while moving the coil springs by using a conveyor chain with a gradual increase in the rotational speed of the coil spring by using tapered rollers, and which drops the heated coil springs into a cooling tank that is filled with a cooling fluid, such as water or oil, to then be cooled in order to thereby improve the manufacturing productivity and the quality of the coil spring. In addition, the present invention further relates to a continuous heating method for coil springs, using the same device.

2. Description of the Prior Art

In general, the coil spring may be used as a buffer to absorb or accumulate energy by using an elastic force of the steel wire, or may be used for the purpose of securing operating functions of various mechanical components by using the restoring elasticity that is a repulsive force after compression.

Meanwhile, the most common type of coil spring is made by winding a steel wire in a spiral form, and the coil spring is manufactured through a basic inspection of a raw material, a surface peeling process, a heating process, a coil forming process, quenching, and tempering.

The coil spring, which has been manufactured as described above, is subject to a series of surface treatment processes in order to improve the mechanical properties of the coil spring and to increase the strength thereof. The surface treatment may be made through a tempering process, a shot peening process, a pre-treatment process, and a painting process after completing the forming and quenching processes of the coil spring. Thereafter, the product is output through a load testing process, a marking process, and a final inspection process.

Typically, the formed coil spring is input to the combustion heating furnace to then be heated about 980° C. or higher, which is higher than the $A_3$ transformation point (the $A_3$ transformation point of steel is 910° C.), for the heat treatment (quenching).

However, if the heat treatment process is automated to be a continuous process, it is difficult to evenly heat the entire area of the coil spring so that the decarburized portion (the portion of which the amount of carbon decreases on the surface due to the oxidization of the carbon on the surface into carbon monoxide when steel is heated in the air) of the coil spring, which is left on the surface of the material after the surface processing, may remain even after heating in order to thereby reduce the endurance life of the coil spring.

Korea Patent No. 10-0752224 discloses a high-frequency induction type heat treatment device for a shaft. According to the invention, a shaft is input between two rotational rollers for an automated continuous heat treatment of a shaft for automobile parts, and the shaft is moved by a conveyor chain while being rotated. Then, the shaft is heated by a high-frequency heating device that is installed in the intermediate position of the shaft movement path.

In the high-frequency induction heating type of heat treatment device for a shaft, a pair of rollers that are rotated on both sides of the lower portion of the shaft may be heated at the same time the shaft is heated so that the rollers exhibit a thermal expansion in the longitudinal direction thereof. Therefore, a high-frequency coil unit for the heat treatment is made to be very short in a ring shape and the shaft is immediately cooled by using a shaft cooling unit.

However, with the structure described above, since it takes a long time to sufficiently heat the shaft, the moving speed of the shaft may slow down so that the number of shafts that are produced per unit hour may decrease and the productivity may be dropped.

In addition, when the coil spring is input between a pair of rollers that are disposed to be parallel with each other in order to perform the heat treatment of the coil spring by using the high-frequency induction heating type of heat treatment device for a shaft, the coil spring may pop out in the rotational direction of the roller because the coil spring is shorter and lighter than the shaft. Therefore, it is difficult to apply the high-frequency induction heating type of heat treatment device to the coil spring.

An induction hardening process of a helical spring and a device thereof, which are disclosed in US Patent Publication No. 2008/0128057, provides a technique in which a helical spring is positioned on a mandrel and is induction-heated while the rotation of the spring is made by being moved on a caterpillar. However, the device has a complicated spring-input process and a complex mechanical configuration, and cannot significantly improve the productivity.

In addition, U.S. Pat. No. 8,912,472 discloses a device for heating a coil spring by using the electric induction heating method while rotating the coil spring on a pair of rotational rollers that are positioned to be parallel with each other to rotate in the same direction. However, when the coil spring is vertically dropped onto the rotational rollers for the input of the coil spring, the coil spring may pop out due to the rotation of the rollers. Furthermore, whenever the coil spring is dropped, the rotational rollers are to be opened wide. Therefore, the continuous heating device requires a complicated configuration and it is difficult to improve the productivity.

In addition, since the heating device has a structure of downwardly inputting the coil spring to the rotational rollers from above, which is suitable to be applied to a big coil spring, it is not suitable for manufacturing a small coil spring.

SUMMARY OF THE INVENTION

The present invention has been made to solve the problems above. An aspect of the present invention is to provide a continuous heating device for coil springs and a continuous heating method for coil springs using the same device in which a coil spring that is formed of a steel wire is heated by using an electric induction coil that is a heating device that does not come in direct contact with a heated object while being moved, and in which the coil spring may be prevented from popping out when it is supplied and a simple structure of the device and a stable continuous operation thereof may be secured with the improvement of the productivity and the quality of the produced coil spring.

In addition, the present invention provides a continuous heating operation of a coil spring in which: central rotation axes of a pair of tapered rollers are arranged to not be parallel with each other; the inner surfaces of the pair of tapered rollers are arranged to be parallel with each other when they are viewed from above; the upper surfaces of the tapered rollers are arranged to be horizontal when they are viewed from the side; a push rod that is mounted on a conveyor chain moves the coil spring; the pair of tapered rollers allow the coil spring to pass through an electric induction coil while gradually increasing the rotational speed of the coil spring from a low speed to a high speed; and the coil spring that is input to the front end portion of the tapered rollers burrows further into the gap between the pair of tapered rollers as it goes from the front end portion to the rear end portion so that the coil spring may be prevented from popping out to then be stable.

The present invention also provides an automated device for heating coil springs for mass production, which: provides a reliable automated heating process of the coil spring in order to thereby improve the productivity; allows the produced coil springs to have the same size, strength, and property in order to thereby enhance the reliability of quality; and enables easy installation and maintenance by adopting a relatively simple structure.

In addition, an embodiment of the present invention may maintain the smooth operation even when the tapered rollers are thermally expanded in the longitudinal direction due to the heating of an electric induction coil by installing an elastic buffer spring in the support shaft of the rear end portion of the roller, and may provide a simple power transmission mechanism that uses a universal joint for transmitting a driving force to the tapered roller in order to effectively transmit a driving force to the shafts of a pair of tapered rollers, which are not parallel with each other.

According to an embodiment of the present invention, a continuous heating device for coil springs may include: a pair of tapered rollers 20 that support and rotate the coil spring 10, that have a cross-section diameter that increases as it goes from the front end portion to the rear end portion, and that have rotational inner surfaces that are arranged to be parallel with each other while the central rotation axes thereof are not parallel with each other; a conveyor chain 43 that has a push rod 41 installed to move the coil spring 10; and a driving unit 60 for providing a rotational driving force to the pair of tapered rollers 20.

In addition, the pair of tapered rollers 20 may be maintained such that the upper surfaces thereof are horizontal.

In addition, the pair of tapered rollers 20 may be formed of a non-magnetic metal roller 21 and a ceramic roller 22.

In addition, the device may further include a roller support shaft 50 and an elastic buffer spring 51 in order to buffer the elongation of the tapered roller 20 in the longitudinal direction.

In addition, the device may further include a universal joint 55 that effectively transfers a rotational force between a pair of driving shafts that are arranged to be parallel with each other in the driving unit 60 and a pair of tapered rollers 20 that are arranged to not be parallel with each other.

In addition, the driving unit 60 may transfer a rotational driving force to two roller shaft gears 63 by using a single power shaft gear 61.

Furthermore, the push rod 41 may be formed of a non-conductive ceramic material.

In addition, the device may further include an induction coil power controller 33 that controls the amount of electric power applied to the electric induction coil 31.

In addition, the device may further include a cooling tank 71 that is filled with a cooling fluid to quench the coil spring 10.

In addition, a continuous heating method for coil springs may include: inputting and rotating a coil spring 10 by means of a pair of tapered rollers 20 such that the coil spring 10 does not pop out of the tapered rollers 20, the tapered rollers 20 having a cross-sectional diameter that increases as it goes from the front end portion to the rear end portion and having rotational inner surfaces that are arranged to be parallel with each other while the central rotation axes thereof are not parallel with each other; moving the coil spring 10 by means of a conveyor chain 43 that has a push rod 41 installed therein; and heating the coil spring by the high-frequency induction magnetic field while moving the coil spring 10 in the section of the electric induction coil 31 by using the tapered rollers 20.

In addition, the method may further include dropping the heated coil spring 10 into the cooling tank 71.

According to the continuous heating device for coil springs and the continuous heating method for coil springs using the same device, the inner surfaces of a pair of tapered rollers are arranged to be parallel with each other when they are viewed from above while the central rotation axes of the tapered rollers are arranged to not be parallel with each other, and the upper surfaces of the tapered rollers are arranged to be horizontal when they are viewed from the side so that the push rod may move the coil spring. Furthermore, the pair of tapered rollers may allow the coil spring to pass through the electric induction coil while gradually increasing the rotational speed of the coil spring from a low speed to a high speed in order to thereby prevent the coil spring from popping out in the rotational direction of the roller when it is input because the coil spring is input to the front end portion of the tapered roller where the circumferential speed of the tapered roller is low. In addition, even when the circumferential speed of the tapered roller increases to a high speed, the coil spring may be stably moved between the tapered rollers without popping out of the same in order to thereby heat the entire area of the coil spring uniformly and in order to thereby improve the quality reliability of the produced coil spring.

In addition, the present invention can rapidly heat a lot of coil springs automatically and continuously without adopting a complicated driving means in order to thereby improve the productivity, and can secure the continuous mass production and the improvement of the productivity even with a simple structure.

In addition, a portion of the tapered roller, which corresponds to the electric induction coil among the whole of the tapered roller, is made of a ceramic material in order not to be significantly affected by the magnetic field caused by the high-frequency induction that is generated in the electric induction coil so that the continuous heating device may be prevented from being unnecessarily heated. In addition, even though the tapered roller is thermally expanded by heating, the smooth rotation of the tapered roller may be maintained by means of the elastic buffer spring that is mounted on the support shaft of the rear end portion of the roller.

In addition, the driving force may be transferred to the shafts of a pair of tapered rollers, which are not parallel with each other, from a single driving force source by using a universal joint. Therefore, even though the shafts of the pair of tapered rollers are not horizontal and are not parallel with each other, the driving force can be effectively transferred with a simple structure.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENTS

Figure 1:
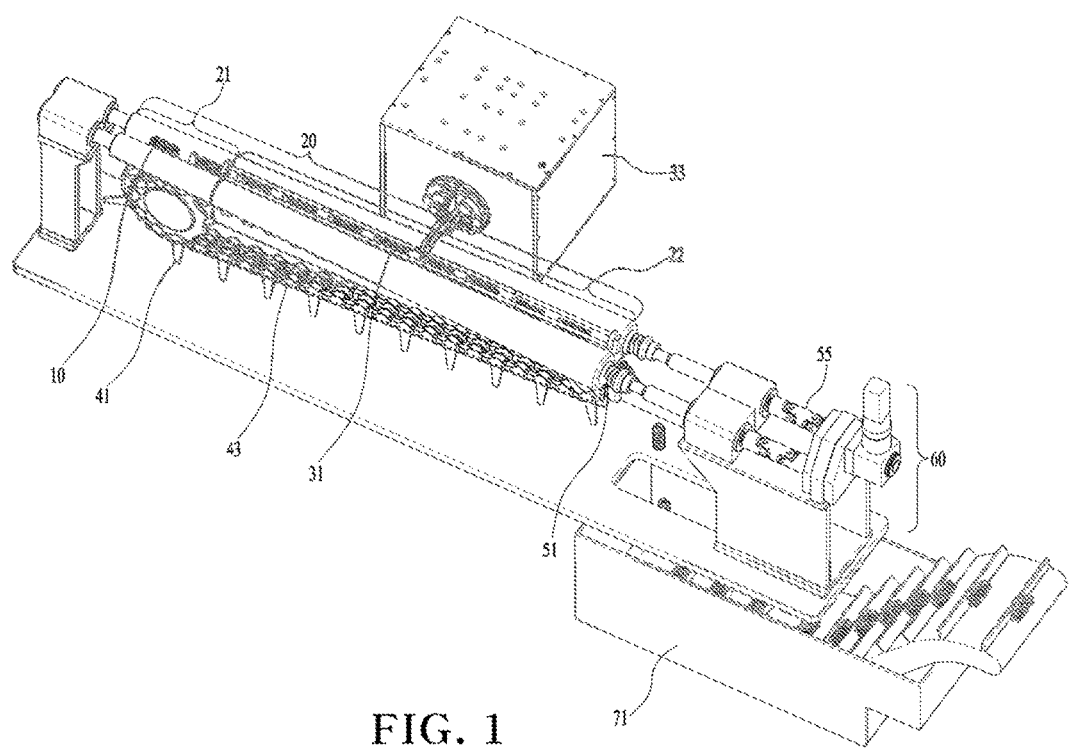
FIG. 1 is a perspective view of a continuous heating device for coil springs, according to a preferred embodiment of the present invention.

Technical terms that are used in the present specification are intended to describe only a specific embodiment, and are not intended to limit the present invention.

Further, the technical terms in the specification should be construed as a meaning generally understood by those skilled in the art unless the terms are defined as another meaning and should not be construed as an excessively inclusive meaning or an excessively exclusive meaning.

In addition, a singular expression used in the specification includes a plural expression as long as they are clearly distinguished in the context. In the present disclosure, the term "comprise" or "include" should not be construed as necessarily including all of various elements or various steps disclosed herein, and it should be understood that some of the elements or steps may not be included, or additional elements or steps may be further included.

In addition, the same reference numeral denotes the same element throughout the present specification.

Hereinafter, a continuous heating device for coil springs and a continuous heating method for coil springs using the same will be described with reference to FIGS. 1 to 6.

FIG. 1 shows a continuous heating device for coil springs, according to a preferred embodiment of the present invention.

In the present invention, a conveyor chain 43 is installed under a pair of rotating tapered rollers 20. The tapered rollers 20 have an input section of the coil spring 10 in the front end portion thereof and have a heating section of the coil spring 10 in the rear end portion thereof. The coil spring 10 may be rotated and moved to then be heated by an electric induction coil 31 that is installed above the heating section of the coil spring 10 of the tapered rollers 20.

In the present invention, the pair of tapered rollers 20 may be shaped into a truncated cylinder that has the minimum diameter in the front end and the maximum diameter in the rear end so that the circumferential speed of the front end portion may be reduced by ½ to ⅓ of the circumferential speed of the rear end portion when the tapered roller 20 is rotated. That is, the circumferential speed may be designed such that the coil spring 10 does not pop out when the coil spring 10 is input to the front end portion (i.e., the input section of the coil spring 10) of the tapered roller 20.

It is preferable to maintain the upper surface of the tapered roller 20 to be horizontal while the central rotation axis of the tapered roller 20 is tilted downwards as it goes from the front end portion to the rear end portion in order to thereby allow the coil spring 10 to horizontally move on the tapered rollers 20.

Figure 4:
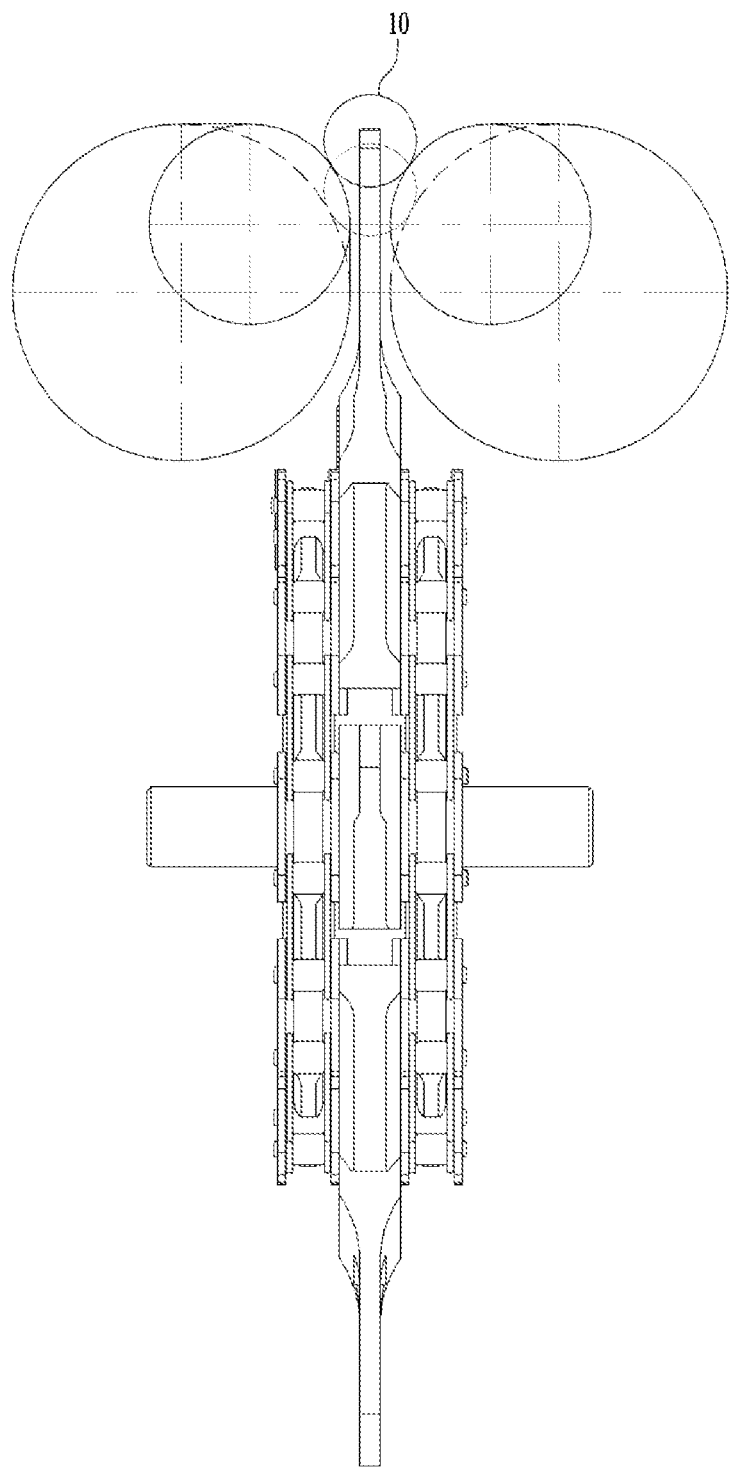
FIG. 4 is a view showing the front end portion and the rear end portion of a pair of tapered rollers 20.

The pair of tapered rollers 20 are required to be spaced a constant distance from each other in order for the coil spring 10 to move on the same. Therefore, it is preferable to install the central rotation axes of the pair of tapered rollers 20 to be spaced more in the rear end portion. Even though the diameter of the tapered roller 20 becomes larger as it goes toward the rear end portion thereof, the gap between the tapered rollers 20 may be maintained to be constant. Thus, the coil spring 10 that is placed on the pair of tapered rollers 20 may be maintained to be stable between the tapered rollers 20 without popping out of the same while moving downstream as shown in FIG. 4.

The coil spring 10, which is placed on the pair of tapered rollers 20 and is rotated by the rotation of the tapered rollers 20, is transferred by the push rod 41 that is mounted on the conveyor chain 43 to pass through the electric induction coil 31. When the coil spring 10 is initially placed on the pair of tapered rollers 20, the rotational speed thereof is low. Although the rotational speed of the coil spring 10 increases as it moves toward the rear end portion, the coil spring 10 may be stable without popping out in order to thereby improve the productivity in the operation of heating the coil spring 10.

The pair of tapered rollers 20 may be supported to be rotatable by means of rotational bearings that are positioned in the front end portion thereof and by means of rotational bearings that are positioned in the roller support shaft 50 that is coupled to the rear end portion of the rollers, and a rotational driving force may be supplied from the driving unit 60.

The tapered roller 20 is separated into the input section of the coil spring 10 and the heating section of the coil spring 10 based on the start point of the electric induction coil 31. Preferably, the input section of the coil spring 10 may be made of a non-magnetic metal roller 21 and the heating section of the coil spring 10 may be made of a ceramic roller 22.

Preferably, the non-magnetic metal roller 21 on which the coil spring 10 to be heat-treated is initially placed may be made of a metal that is hardly heated by the magnetism in order not to be easily heated by the electric induction coil 31.

The electric induction coil 31 may be disposed through the entire area above the ceramic roller 22, and may heat the coil spring 10.

Figure 2:
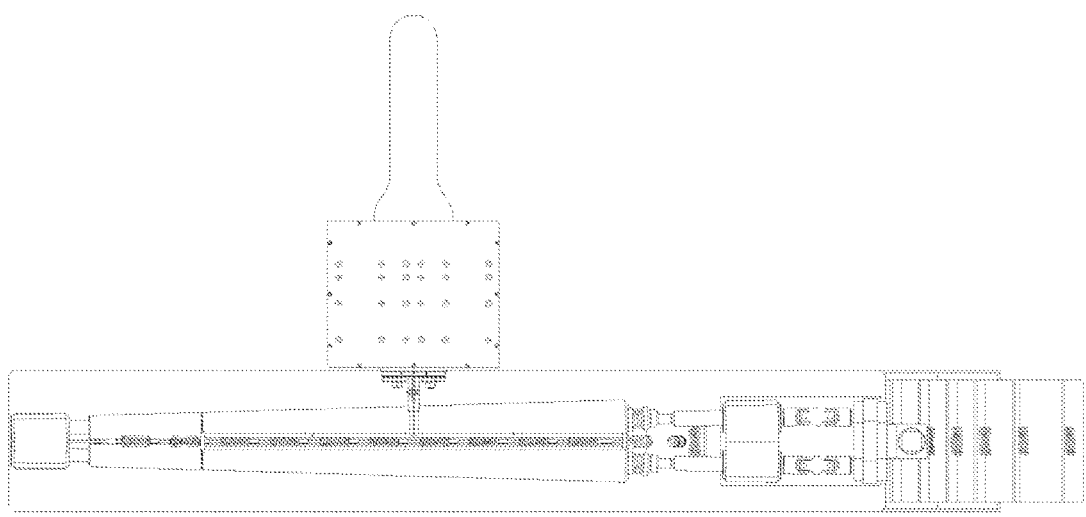
FIG. 2 is a view illustrating a continuous heating device for coil springs 10 when it is viewed from above.

Referring to FIG. 2 showing the continuous heating device for coil springs as viewed from above, the central rotation axes of the pair of tapered rollers 20 are not parallel with each other, and are spaced at a constant angle as it goes toward the rear end portion thereof.

In addition, the cross-sectional diameter of the tapered roller 20 increases as it goes from the front end portion to the rear end portion.

Since the coil spring 10 to be produced has a constant diameter, the inner surfaces of the pair of tapered rollers 20, which come in contact with the coil spring 10, may be preferably arranged to be parallel with each other.

As shown in FIG. 4, the coil spring 10 may come in full contact with the pair of tapered rollers 20 at both sides of the lower portion of the coil spring 10 because the inner surfaces of the tapered rollers 20 are arranged to be parallel with each other.

Figure 3:
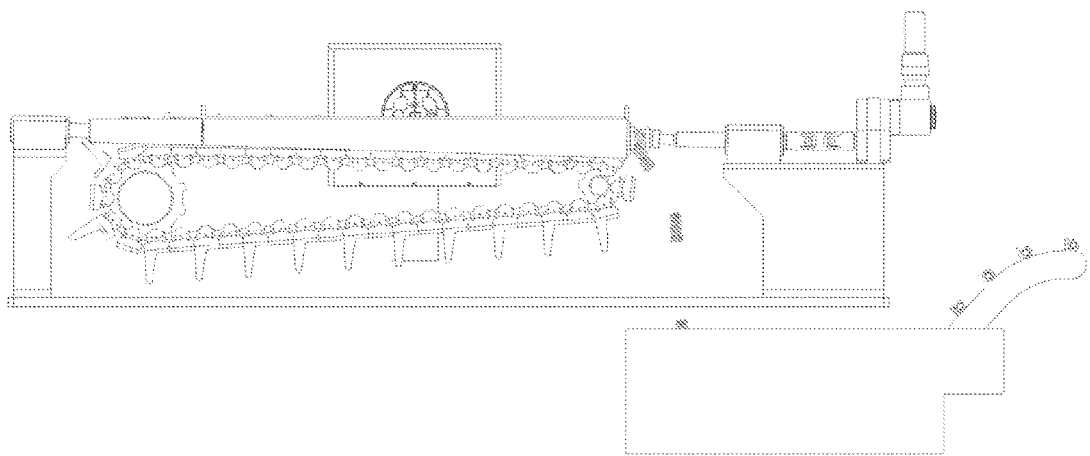
FIG. 3 is a view illustrating a continuous heating device for coil springs when it is viewed from the side.

In addition, referring to FIG. 3 showing the continuous heating device for coil springs as viewed from the side, the central rotation axes of the pair of tapered rollers 20 are tilted downwards as it goes from the front end portion to the rear end portion while the upper surfaces of the tapered rollers 20 are maintained to be horizontal.

With the structure described above, the coil spring 10 burrows further into the gap between the pair of tapered rollers 20 as it is moved by the push rod 41 from the front end portion of the roller to the rear end portion thereof.

In addition, although the angular velocity of tapered roller 20 remains constant through the entire area, the diameter of the tapered roller 20 increases as the coil spring 10 moves by means of the push rod 41 from the front end portion of the roller to the rear end portion thereof so that the circumferential speed increases in order to thereby gradually elevate the rotational speed of the coil spring 10.

The electric induction coil 31 is supplied with an electric power corresponding to the temperature to be heated by an induction coil power controller 33, and a water jacket may be further provided along the electric induction coil 31, through which cooling water flows to avoid an excessive increase in the temperature of the electric induction coil 31.

When the coil spring is heated by the electric induction coil 31, the heat is transferred to the ceramic roller 22 that is in contact with the coil spring 10 to rotate the same so that the tapered roller 20 may be thermally expanded and the rotation axis elongates in the longitudinal direction.

Figure 5:
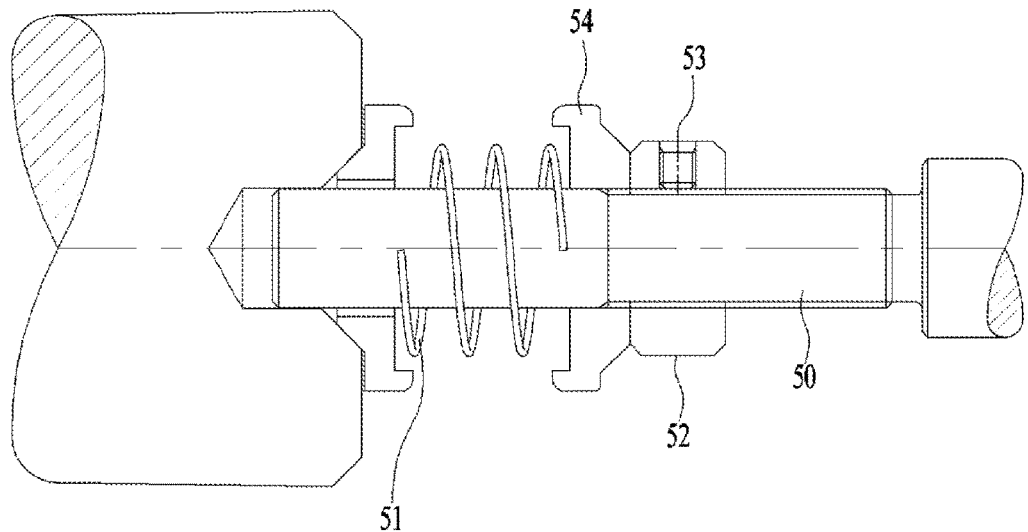
FIG. 5 is an enlarged view of a rear-end support shaft of the tapered roller 20.
Figure 6:
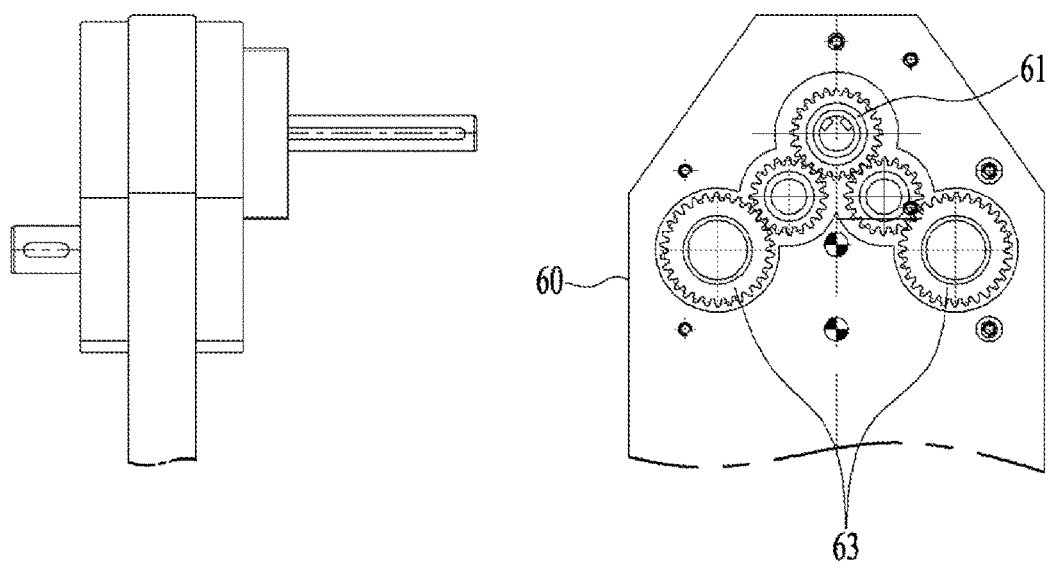
FIG. 6 is a view showing the installation state of gears that transfer a driving force from the driving unit 60 to the shaft of the tapered roller 20.

In order to buffer the longitudinal deformation (such as the thermal elongation or contraction of the tapered roller 20 in the axial direction), as shown in FIG. 5, the rear end portion of the tapered roller 20 is coupled to, and supported by, a roller support shaft 50, and an elastic buffer spring 51 is coupled by a nut 52 that is engaged with a thread formed on the roller support shaft 50. Thus, the central rotation axis of the tapered roller 20 may receive a rotational driving force that is generated by the driving unit 60 by being integrated with the roller support shaft 50. The fastening of the nut 52 may be reinforced by a set screw 53.

Meanwhile, the central rotation axes of the pair of tapered rollers 20 may have a constant angle between the same from the front end portion of the roller to the roller support shaft 50.

Although a pair of rotation shafts that generate a driving force in the driving unit 60 may be arranged to not be parallel with each other by means of a bevel gear, the driving unit 60 may be configured such that a single power shaft gear 61 drives two roller shaft gears 63 for the simplicity of design.

In addition, the roller support shaft 50 may be preferably connected to the roller shaft gear 63 of the driving unit 60 by a universal joint 55 that effectively transfers a driving force even though the gear rotation shafts are at an angle therebetween.

A cooling tank 71 is provided under the end portion of the tapered roller 20, which is filled with cooling oil or cooling water to quench the coil spring 10.

The heating method for coil springs by using the continuous heating device for coil springs, which has the configuration described above, may be performed according to the following sequence.

First, the coil spring 10 is placed on and between a pair of tapered rollers 20. Then, the push rod 41 that is installed in the conveyor chain 43 moves the coil spring 10 placed on the pair of tapered rollers 20 toward the cooling tank 71 by means of the movement of the conveyor chain 43.

The conveyor chain 43 moves under the center of the pair of the tapered rollers 20. The push rod 41 mounted on the conveyor chain 43 passes through the gap between the pair of tapered rollers 20. Therefore, referring to FIG. 3, when the conveyor chain 43 moves clockwise, the coil spring 10 positioned in the center of the pair of tapered rollers 20 may be transferred by the push rod 41 from the front end portion of the roller to the rear end portion thereof.

Tools for transferring the coil spring 10 are not limited to the push rod 41, and various tools may be adopted. For example, the tool may be formed to have a rough surface in order to thereby transfer the coil spring by means of a friction force with respect to the coil spring 10, or may be made in the form of a hook that may hook and transfer the coil spring 10.

The push rod 41 that is mounted on the conveyor chain 43 may be preferably made of a ceramic material in order to avoid being affected by the magnetic field that is generated through a high-frequency induction of the electric induction coil 31.

Meanwhile, the conveyor chain 43 that continuously moves may be preferably made of stainless steel that has a high durability.

The coil spring 10 may be transferred toward the section of the electric induction coil 31 along the center of the pair of tapered rollers 20 by means of the push rod 41 mounted on the conveyor chains 43 according to the movement of the conveyor chain 43 while being rotated.

Since the electric induction coil 31 has an open structure, the coil springs 10 may be continuously transferred and heated.

In addition, the pair of tapered rollers 20 rotate in the same direction and the coil spring 10 is rotated between the pair of the tapered rollers 20. Thus, the coil spring 10 is rotated while being linearly moved toward the electric induction coil 31 by the push rod 41.

The electrical induction coil 31 is disposed above the tapered rollers 20 to receive and heat the coil spring 10.

Meanwhile, one or more electric induction coils 31 may be provided, and the electric induction coil 31 generates a magnetic field by a high-frequency induction current that is supplied from the induction coil power controller 33 in order to thereby heat the coil spring 10 in the manner of the electric induction.

That is, when a current is supplied to the electric induction coil 31 by the high-frequency induction, a high-frequency induced magnetic field is generated around the electric induction coil 31 so that heat occurs in the coil spring 10 that is positioned in the range of the high-frequency induced magnetic field in order to thereby heat the coil spring 10.

The coil spring 10 does not come in direct contact with the heat source in the process of heating the coil spring 10 by the electric induction, and the conductive coil spring 10 generates the heat in itself by means of the high-frequency induced magnetic field to then be heated while the coil spring 10 is rotated. Therefore, the coil spring 10 may be heated throughout the entire area thereof.

In addition, the heating temperature of the coil spring 10 passing through the electric induction coil 31 may be adjusted by controlling the moving speed of the conveyor chain 43, or the heating uniformity of the coil spring 10 passing through the electric induction coil 31 may be adjusted by controlling the rotational speed of the tapered roller 20 in order to thereby produce the coil spring 10 with a high quality reliability.

The coil spring 10 that has been heated by the electric induction coil 31 may be directly dropped into the cooling tank 71 in order to increase the effectiveness of the quenching.

The cooling tank 71 is filled with a cooling fluid, such as water or oil, to quench the coil spring 10, and the temperature of the cooling fluid may be adjusted to a constant range by a temperature control device for the effective quenching.

Although the embodiments of the present invention have been described with reference to the accompanying drawings, those skilled in the art will understand that the present invention may be implemented in other specific forms without changing the technical spirit or essential features thereof.

Therefore, it should be understood that the embodiments described above are only examples and do not limit the present invention. The scope of the present invention described in the detailed description will be construed by the claims below, and will encompass all of changes or modifications that are derived from the meaning and range of the claims and the equivalents thereof.

What is claimed is:

1. A continuous heating device for a coil spring, the device comprising:
    a pair of tapered rollers configured to support and rotate the coil spring, configured to have a cross-sectional diameter that increases as it goes from a front end portion to a rear end portion, and configured to have rotational inner surfaces that are arranged to be parallel with each other while the central rotation axes thereof are not parallel with each other;
    an electric induction coil configured to heat the coil spring;
    a conveyor chain configured to have a push rod that is installed therein to move the coil spring; and
    a driving unit configured to provide a rotational driving force to the pair of tapered rollers.

2. The device according to claim 1, wherein upper surfaces of the pair of tapered rollers are horizontal.

3. The device according to claim 1, wherein the pair of tapered rollers are formed of a non-magnetic metal roller and a ceramic roller.

4. The device according to claim 1, further comprising a roller support shaft and an elastic buffer spring that are configured to buffer an elongation of the tapered roller in the longitudinal direction.

5. The device according to claim 1, further comprising a universal joint that is configured to effectively transfer a rotational force between a pair of driving shafts that are arranged to be parallel to then be driven in the driving unit and the pair of tapered rollers that are arranged not to be parallel.

6. The device according to claim 1, wherein the driving unit is configured to transfer a rotational driving force to two roller shaft gears by using a single power shaft gear.

7. The device according to claim 1, wherein the push rod is formed of a non-conductive ceramic material.

8. The device according to claim 1, further comprising an induction coil power controller that is configured to control an amount of electric power applied to the electric induction coil.

9. The device according to claim 1, further comprising a cooling tank that is filled with a cooling fluid to quench the coil spring.

10. A continuous heating method for a coil spring, the method comprising:
    inputting and rotating the coil spring by a pair of tapered rollers such that the coil spring does not pop out of the tapered rollers, the tapered rollers having a cross-sectional diameter that increases as it goes from a front end portion to a rear end portion and having rotational inner surfaces that are arranged to be parallel with each other while the central rotation axes thereof are not parallel with each other;
    moving the coil spring by a conveyor chain that has a push rod installed therein; and
    heating the coil spring by a high-frequency induced magnetic field while rotating the coil spring by using the tapered rollers in a section of an electric induction coil.

11. The method according to claim 10, further comprising dropping the heated coil spring into a cooling tank.

* * * * *